United States Patent [19]
Gray et al.

[11] Patent Number: 5,454,031
[45] Date of Patent: Sep. 26, 1995

[54] DIAL INBOUND METER INTERFACE UNIT WHICH DERIVES ITS POWER FROM A TELEPHONE LINE

[75] Inventors: Bruce E. Gray, Murrysville; Donald R. Fletcher, Belle Vernon, both of Pa.

[73] Assignee: M & FC Holding Company, Inc., Wilmington, Del.

[21] Appl. No.: 400,549

[22] Filed: Mar. 8, 1995

Related U.S. Application Data

[63] Continuation of Ser. No. 72,518, Jun. 4, 1993, abandoned.

[51] Int. Cl.[6] .................................................. H04M 11/00
[52] U.S. Cl. ............................................ 379/106; 379/413
[58] Field of Search ........................... 379/106, 107, 379/399, 413; 340/870.01, 870.02

[56] References Cited

U.S. PATENT DOCUMENTS

| | | |
|---|---|---|
| 3,390,234 | 6/1968 | Glidden . |
| 3,553,376 | 1/1971 | Bogaart et al. . |
| 3,588,357 | 6/1971 | Sellari, Jr. . |
| 3,842,208 | 10/1974 | Parasekvakos et al. . |
| 3,883,695 | 5/1975 | Bickel et al. . |
| 3,922,490 | 11/1975 | Pettis . |
| 4,077,030 | 2/1973 | Helava ........................... 340/183 |
| 4,086,434 | 4/1978 | Bocchi . |
| 4,104,486 | 8/1978 | Martin et al. . |
| 4,126,762 | 11/1978 | Martin et al. . |
| 4,132,981 | 1/1979 | White ............................ 340/203 |
| 4,180,709 | 12/1978 | Cosgrove et al. . |
| 4,345,113 | 8/1982 | Shelley ........................... 179/2 A |
| 4,355,205 | 10/1982 | Walker . |
| 4,394,540 | 7/1983 | Willis ............................. 179/2 A |
| 4,455,453 | 6/1984 | Parasekvakos ................. 179/2 AM |
| 4,463,354 | 7/1984 | Sears ............................. 340/870.02 |
| 4,469,917 | 9/1984 | Shelley ........................... 179/2 DP |
| 4,504,831 | 3/1985 | Jahr et al. . |
| 4,549,044 | 10/1985 | Durham . |
| 4,578,534 | 3/1986 | Shelley ........................... 179/2 AM |
| 4,578,536 | 3/1986 | Oliver ............................ 179/2 AM |
| 4,578,541 | 3/1986 | Dodds ............................ 379/413 |
| 4,608,552 | 8/1986 | Boutannant ..................... 340/310 |
| 4,644,103 | 2/1987 | Rosenfeld ....................... 379/42 |
| 4,652,877 | 3/1987 | Gray .............................. 340/870.02 |
| 4,654,868 | 3/1987 | Shelley . |
| 4,682,169 | 7/1987 | Swanson . |
| 4,691,344 | 9/1987 | Brown et al. ................... 379/106 |
| 4,803,719 | 2/1989 | Ulrich ............................ 379/399 |
| 4,847,892 | 7/1989 | Shelley .......................... 379/92 |
| 4,852,152 | 7/1989 | Honick .......................... 379/97 |
| 5,134,650 | 7/1992 | Blackmon ...................... 379/107 |
| 5,189,694 | 2/1993 | Garland ......................... 379/106 |
| 5,202,916 | 4/1993 | Oliver ............................ 379/106 |
| 5,204,896 | 4/1993 | Oliver ............................ 379/106 |
| 5,239,575 | 8/1993 | White ............................ 379/107 |

FOREIGN PATENT DOCUMENTS 1253826  11/1971  United Kingdom ............ G01D/5/252

OTHER PUBLICATIONS

Schlumberger Industries, Inc. Communication Systems Division, MIU T–1002 (1992), (2 page sales brochure).
Disclaimer of joint inventorship (see attached statement).
PCT Publication WO 87/07993 (PCT/US87/01509) Dec. 30, 1987.

Primary Examiner—Wing F. Chan
Attorney, Agent, or Firm—Lorusso & Loud

[57] ABSTRACT

The present invention is a dial in-bound MIU capable of deriving its operating current from a telephone line. The MIU is coupled to the telephone line using conventional practices. The MIU has the capacity to initiate data transmission at a predetermined time or upon demand by the customer or the utility company. The MIU includes a microprocessor which serves as the command processing center for the MIU. The microprocessor also manages all time dependent functions for the MIU. When the microprocessor determines that data transmission is required, the MIU dials up a central computer using a modem built into the MIU circuitry.

16 Claims, 10 Drawing Sheets

DIAL INBOUND METER INTERFACE UNIT WHICH DERIVES ITS POWER FROM A TELEPHONE LINE

This is a continuation of application Ser. No. 08/072,518 filed Jun. 4, 1993 now abandoned.

BACKGROUND OF THE INVENTION

1. Field of Invention

The invention relates to an apparatus for calling a central computer and transmitting information over the telephone lines.

Definitions

For clarity and understanding the following definitions will be used:

a. Meter Interface Unit (MIU) refers to an electronic unit located at a customer's residence, and connected to the telephone line. The MIU interfaces with a meter encoder to provide meter data readings. The MIU connects to a telephone line through a switched telephone network. The MIU reports meter data readings to a central computer via the telephone line.

b. Central computer refers to a computer located at a utility office. The central computer is equipped with modems and telephone lines for placing and receiving telephone calls to and from the MIU.

c. Microprocessor is the command processing center of the MIU.

d. Dial In-bound MIU refers to a MIU which calls a central computer via the telephone line for the purposes of data transmission.

e. Dial Out-bound MIU refers to a MIU which receives a call from a central computer for the purpose of initiating a data transmission cycle.

f. On-hook refers to the state of a telephone instrument when the handset is in its normal position on the body of the telephone instrument.

g. Off-hook refers to the state of a telephone instrument when the telephone is in use. The off-hook state occurs when the handset is lifted from the body of the telephone instrument such that current flows to the telephone instrument.

h. Ring signals are signals on the telephone line indicating that a telephone call is being placed to the customer's telephone.

2. Description of the Prior Art

Dial in-bound meter interface units (MIU) dial-up a central computer for purposes of transmitting utility meter data. The MIU dials up the central computer periodically or at a predetermined time. A typical MIU dial-up function requires the remote unit to seize the telephone line and dial the telephone number for the central computer. Once a connection is established, the MIU reports the desired information.

Power to operate an MIU is generally obtained from the installation site, i.e., the customer's premises, or from an external power supply such as a battery. Drawing power from the installation site causes the undesirable result of increasing the customer's energy consumption. Thus, resulting in higher energy costs to the customer.

U.S. Pat. Nos. 4,455,453; 4,469,917; 4,847,892; and 4,578,534 all disclose dial in-bound MIUs powered by an external battery. The use of an external battery renders the MIU more costly to maintain. External battery supplies also interfere with the installation of MIUs in confined spaces such as pits.

U.S. Pat. No. 4,847,892 discloses a MIU having both dial in-bound and remote monitoring capabilities. During the dial in-bound cycle, the MIU calls up the central computer at a preset time. Timing control functions are regulated by a clock in the MIU system. In the remote monitoring phase, a clock controlled timing circuit connects the data set to a subsystem which stands-by during a predetermined time interval to detect a call from the central computer. The operation and maintenance of the disclosed device, however, is hampered by the need for an external power supply.

U.S. Pat. No. 5,134,650 is described as disclosing a dial in-bound MIU. However, the disclosed invention actually performs as a dial out-bound MIU. Generally, in dial out-bound system, the central computer calls the remote unit to initiate data transmission.

In U.S. Pat. No. 5,134,650, the MIU monitors the telephone line for the detection of ring signals. When a ring signal is detected, the MIU determines whether the telephone was answered, i.e., whether the telephone is on or off-hook. If the telephone is on-hook, the MIU continues to monitor the line. If the telephone is off-hook, the MIU monitors the telephone line to determine when the telephone goes back to on-hook state. As soon as on-hook conditions are detected, the MIU seizes the telephone line. The MIU searches the telephone line for a modem answer tone issued by the central computer. If the modem answer tone is detected, the MIU connects the telephone line to the modem of the automatic metering equipment. This completes the connection to the central computer. Thus, the remote unit never calls the central computer. The remote simply comes on line to begin data transmission if it detects the appropriate command from the central computer.

The disclosed MIU does not contain a clock or timing mechanism. The MIU does not have the capacity to self initiate a call to the central computer. The MIU requires customer or utility company intervention before a meter read and data transmission can take place.

U.S. Pat. No. 4,644,103 discloses a meter interface unit which derives its operating current from a telephone line. Telephone line current is used to energize a tone detection circuit. The tone detection circuit is responsible for determining if the MIU is being interrogated by the central computer. The tone detection circuit is an intermittently functioning circuit. Power dissipation is required every few seconds to ensure proper functioning of the circuit. Unfortunately, the short power discharge intervals associated with this device limit its capability to signal detection only. Moreover, the telephone must be frequently placed in the off-hook state to accommodate recharging of a voltage regulating capacitor. The constant recharging of the capacitor increases the likelihood of causing interference with the customer's use of the telephone line.

The prior art does not enable a dial in-bound MIU to draw all of its operating current from the telephone line. The prior art only enables a MIU to draw sufficient current from the telephone line to detect a pulse, indicating that a data transmission is requested.

Furthermore, Utility Regulation, 47 C.F.R. § 68,312, limits the amount of current which can be drawn from telephone lines while the telephone is in the "on-hook" state. The on-hook state results when the telephone handset is in place on the telephone instrument. The handset depresses a switch which disconnects the telephone instrument from the telephone line, resulting in an open circuit. During on-hook conditions, any device connected to the telephone line must have an effective resistance between tip and ring of greater than 5 megohms. A 5 megohm resistance corresponds to about 9.6 microamps of available supply current at 48 volts.

When the handset is lifted "off-hook" the telephone is connected to the line and current flows to the telephone instrument. In the off-hook state, the telephone is available for use. When the telephone is in the off-hook state, utility regulation 47 C.F.R. 68.312 no longer limits the current which may be drawn from the telephone line.

The disadvantages associated with existing systems are many. Existing systems require an external source of power. This power is obtained either from the installation site or provided by an external battery. External power sources make the MIU more costly to install and maintain. Additionally, external power supplies interfere with the installation of the MIU in small confined areas. Further, existing MIUs are programmed to communicate with the central computer only at a pre-selected time or during a pre-selected time interval.

Therefore, a dial in-bound MIU having the capacity to derive all of its operating current from the telephone line and to make scheduled and unscheduled calls to the central computer has not been achieved in the prior art. An MIU having the aforementioned attributes overcomes the disadvantages associated with prior art MIUs.

SUMMARY OF THE INVENTION

An object of the present invention is to operate a dial in-bound MIU without an external battery.

Another object of the invention is to obtain operating current from the telephone line.

A further object of the invention is to interface with several different types of meter encoders.

Further still, an object of the invention is to detect and report tamper conditions to a central computer.

A further object of the invention is to maintain a timing system for determining when the preselected call-in time has occurred.

Further still, an object of the invention is to store telephone numbers to be called for reporting data.

Another object of the invention is to communicate with the central computer using defined commands and responses.

An additional object is to incorporate a scheme whereby the central computer shall communicate with the MIU to obtain an unscheduled reading or report.

A further object is to establish a method of checking the stored data for corruption.

Further still, an additional object is to report data corruption to a central station.

The objects of the present invention are achieved by a MIU capable of deriving power from a telephone line. The current drawn from the telephone line enables the MIU to transmit utility related data over the telephone line to a central computer. The MIU is coupled to the telephone line using fuse resistors attached to the line in accordance with recognized practices. In the on-hook state, leakage current is drawn from the telephone line to charge a capacitor which provides stand-by power for the MIU. In the off-hook state, the MIU draws sufficient current from the telephone line to operate the MIU circuitry. The MIU uses a microprocessor to process and issue all commpand sent to and received from the elements of the MIU. The microprocessor also determines when to commence a data transmission sequence. When data transmission is required, a single-chip modem is used to dial the central computer.

DESCRIPTION OF THE PREFERRED EMBODIMENT

The basic function of the present MIU design is to dial-up a central computer to report utility meter readings. The dial in-bound function is accomplished automatically. No customer or utility company intervention is required. However, the MIU is capable of providing unscheduled meter readings on demand by the customer or the utility company.

The MIU is designed to operate in an outdoor environment and to interface with meters located in pits. Often, the MIU will be placed in unsheltered locations. However, it will not be harmed by rain, snow, or other elements of nature. To insure maximum protection, the MIU hardware is transformer coupled to all outside interfaces. The MIU has an operating temperature range of −40 degrees celsius to +65 degrees celsius.

The preferred embodiment is now described with reference to the drawings.

Figure 1:
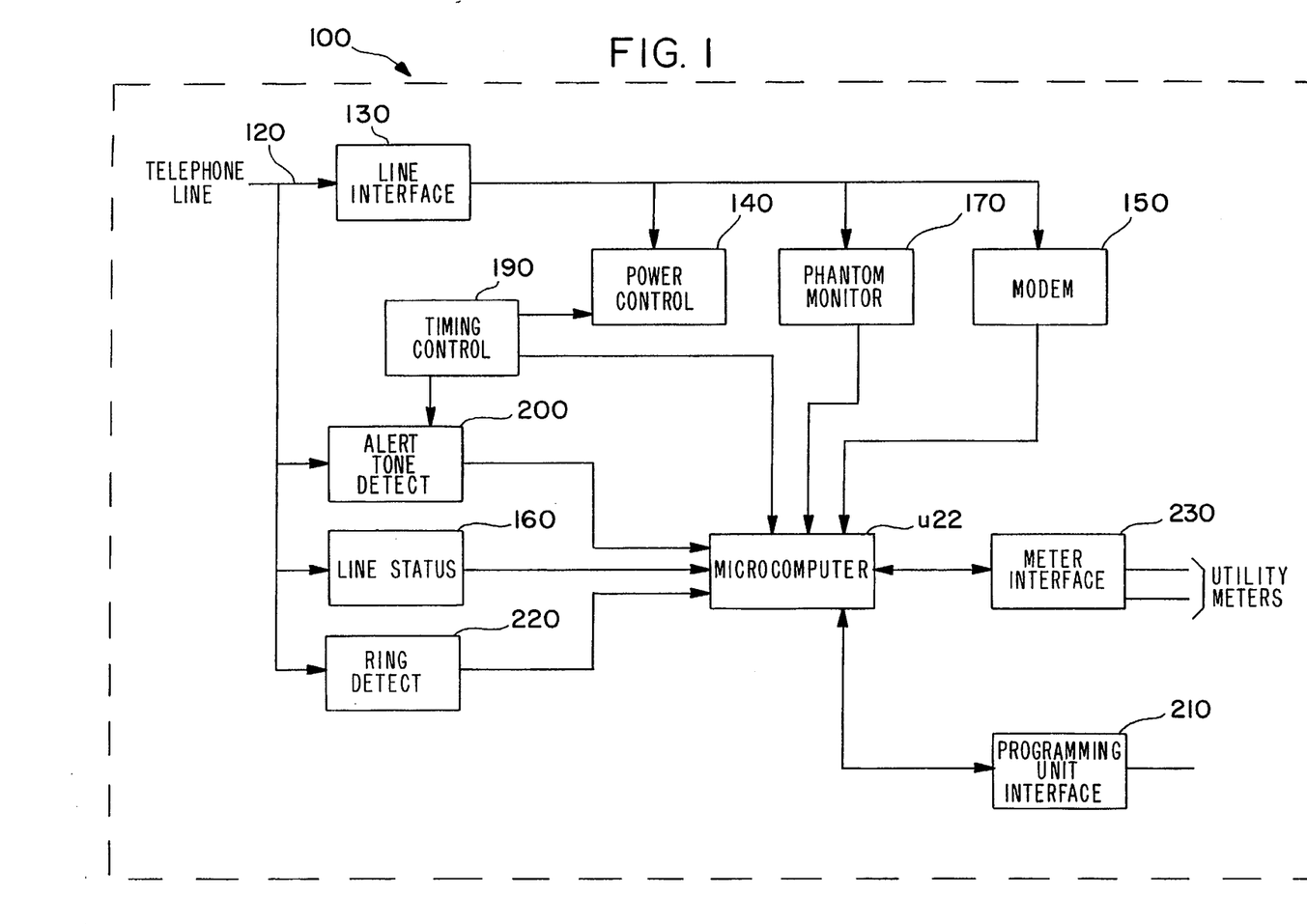
FIG. 1 is a block diagram of the call in-bound MIU.

FIG. 1 is a block diagram of the MIU 100 operating system. The telephone line interface 130 directly couples the MIU 100 to the telephone line 120. The MIU 100 draws its operating current from the telephone line 120 through the telephone line interface 130. The MIU 100, however, does have the capacity (as shown in FIG. 2b) to connect to and receive current from an external power supply.

When the MIU 100 is operating under normal conditions, all operating current is drawn from the telephone line 120. Power control 140 for the MIU 100 is managed by a large double-layer capacitor as further described in FIG. 2a.

The MIU 100 communicates with a central computer (not shown) via the telephone line 120. The MIU uses a built-in modem 150 to dial-up the central computer. However, before seizing the telephone line 120, the MIU line status circuitry 160 determines whether the telephone line 120 is busy. If the line status circuit 160 determines that the telephone line 120 is not busy, the MIU 100 seizes the telephone line 120. The phantom monitor 170 will cause the MIU 100 to disconnect from the telephone line 120 should the customer pick-up the handset.

The timing control circuit 190 regulates all MIU time dependent functions. The timing control circuit 190 triggers the alert tone detect circuit 200. The timing control circuit 190 also provides a periodic wake-up signal to the microprocessor U22, which keeps track of the next scheduled meter reporting time.

The alert tone detect circuit 200 powers up every two seconds to survey the telephone line 120 for a 520 Hz tone generated from the central computer. If the tone is detected, the microprocessor U22 is powered-up to demodulate the signal.

The ring detect circuit 220 monitors the number of ring signals on the telephone line 120 caused by a single call to the customer's telephone. If a pre-programmed number of ring signals are detected, the MIU 100 will schedule a standard data transmission cycle.

The microprocessor U22 controls all command processing and memory functions for the MIU 100. Each element of the MIU 100 sends and/or receives information to and/or from the microprocessor U22. The microprocessor U22 processes the information and determines the next task.

The MIU programming unit interface 210 allows certain information stored in the microprocessor U22 memory to be configured during installation. The programming interface unit 210 is a non-isolated meter port that enables a portable programming unit to interrogate and configure the MIU 100.

The MIU 100 interfaces with encoder-type utility meters through meter interface 230 using a direct wired connection. The MIU 100, however, contains internal physical isolation circuitry which isolates the MIU 100 galvanically from the telephone line 120.

The meter interface 230 also provides a port for receiving tamper detection wiring. The tamper detection port is configured by using one meter port as a continuity loop detector. If the loop is broken, the MIU 100 will report this fact to the central computer during a routine data transmission.

Figure 2A:
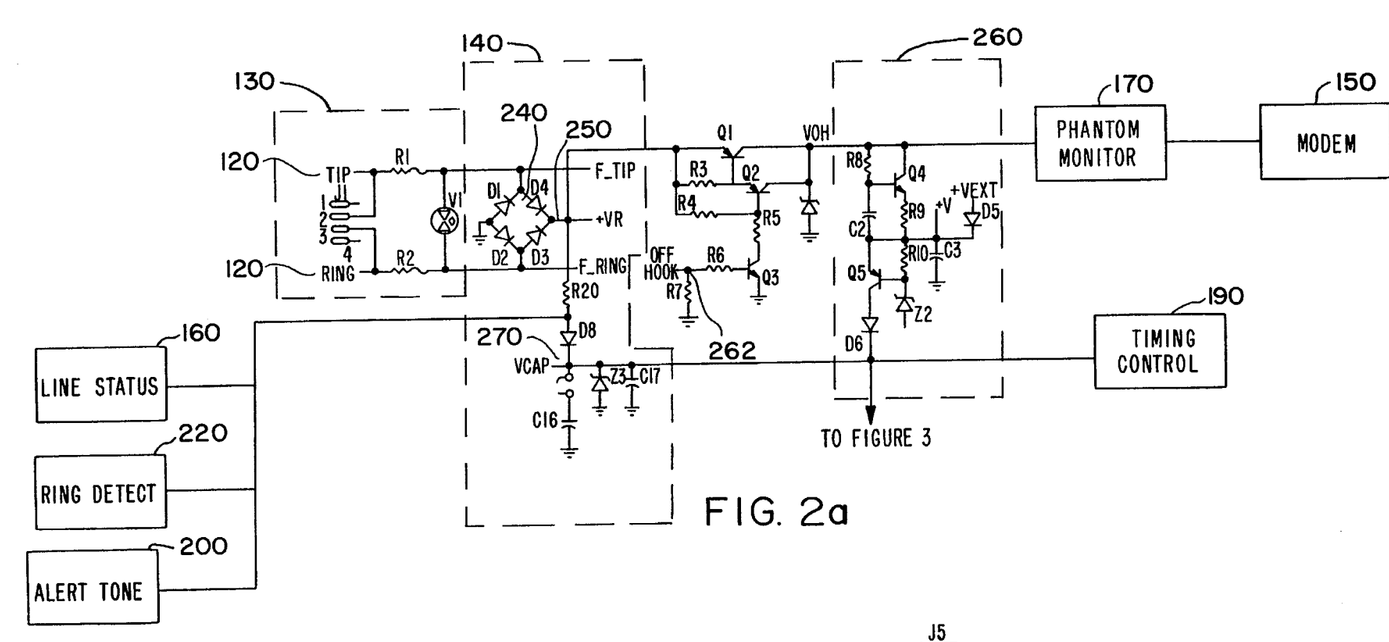
FIG. 2a is a schematic of the telephone line interface and power control circuits. Other MIU elements are depicted in block diagram form.
Figure 2B:
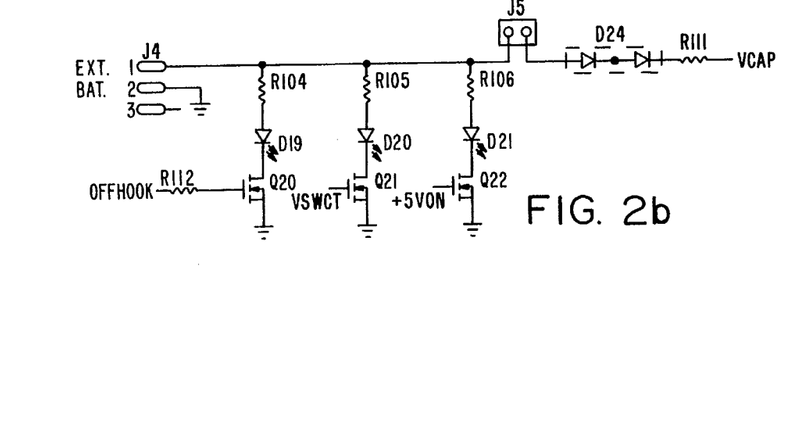
FIG. 2b shows a schematic of the external power supply interface.

FIG. 2a shows a schematic diagram of the line interface circuit 130 and the power control circuit 140. The telephone interface circuit 130 includes fuse resistors R1 and R2. Fuse resistors R1 and R2 draw a small leakage current from the telephone line. Fuse resistors R1 and R2 are connected, respectively, across the Tip (+) and Ring (−) terminals of telephone line 120 in accordance with recognized practices. Fuse resistors R1 and R2, along with transient suppressor V1, protect the MIU 100 from high voltage transients which may occur at the telephone line interface. Fuse resistors R1 and R2, along with full wave rectifier 240, correct the polarity of the current drawn from the telephone line 120. The rectified output 250 of rectifier 240 is used to source current to capacitor C16 through resistor R20. Capacitor C16 and resistor R20 form the power supply of the MIU 100 in the on-hook state. Voltage Vcap is measured from TIP (120) through D8. Although Vcap is variable, it lies in the range of about 3 to 5 volts.

However, when the MIU 100 is in the off-hook state, the MIU 100 receives all of its operating current from the telephone line 120 through transistor network 260. During off-hook conditions, the current drawn from the telephone line 120 is of greater amperage than the small leakage drawn from the telephone line under on-hook conditions. With respect to the voltages seen in FIGS. 2a and 2b, note that voltage +Vext is an externally supplied voltage source at the programming port (see R103 in FIG. 8). This voltage is applied only when the MIU is being programmed, at which time the MIU is not connected to a telephone line. Voltage +V, also shown, is a net name for power derived from current through Q4 and R9. Normally +V is zero volts when the MIU is on-hook. When the MIU is off-hook, +V is typically 6 volts. The current from the TIP-RING pair is the power source via Q1, Q4, etcetera. As shown in 260, +V is also sourced from +Vext via diode D5. In this case, +Vext is generated when an external device is attached to the programming port, and supplies power to the MIU.

When the MIU 100 desires to assume off-hook conditions, the microprocessor supplies a voltage at node 262. The voltage at node 262 causes a voltage drop across resistor R6 which is used to turn on transistors Q3, Q2 and Q1. When transistor Q1 is on, current from telephone line 120 flows to the transistor network 260. Transistor network 260 includes capacitor C2; resistor R10; diode D6 and transistors Q4 and Q5. Transistor network 260 acts as a DC current source. Transistor network 260 provides a DC current path with high AC impedance. When transistors Q4 and Q5 are active, the transistor network 260 draws the maximum amount of current which the transistor network 260 can safely handle.

The on-hook power supply consists of capacitor C16 and resistor R20. Capacitor C16 is a large double-layer high energy storage capacitor. Capacitor C16 provides current to the MIU 100 during periods when there is minimal or no current available from the telephone line 120. Capacitor C16 is capable of storing enough charge to operate for a 24 hour period. Additionally, capacitor C16 provides higher intermittent voltage levels than those which can be drawn from the telephone line 120 in the on-hook state. Capacitor C16 is charged by a small current through resistor R20. Resistor R20 is a very high value (10 megohm) resistor and the capacitor in an exemplary embodiment has a capacitance of 0.22 Farads. Resistor R20 is required to meet the high DC on-hook impedance requirements set by utility regulations. All circuitry is active during on-hook conditions except that which is powered by +V, that being the voltage obtained from the telephone line when it is off-hook. However all of such circuitry is not continuously active during on-hook conditions. The basis for low power operation is such that only circuitry needed at a given time is active.

Diode Z3 establishes a limiting voltage in the MIU 100 circuit to prevent a damaging overcharge to capacitor C16. Capacitor C17 provides a low AC impedance across the Vcap 270 power supply. Vcap 270 supplies voltage to the voltage switched control (Vcsw) 280 (shown in FIG. 3), the microprocessor U22, and the timing control circuit 190.

Figure 3:
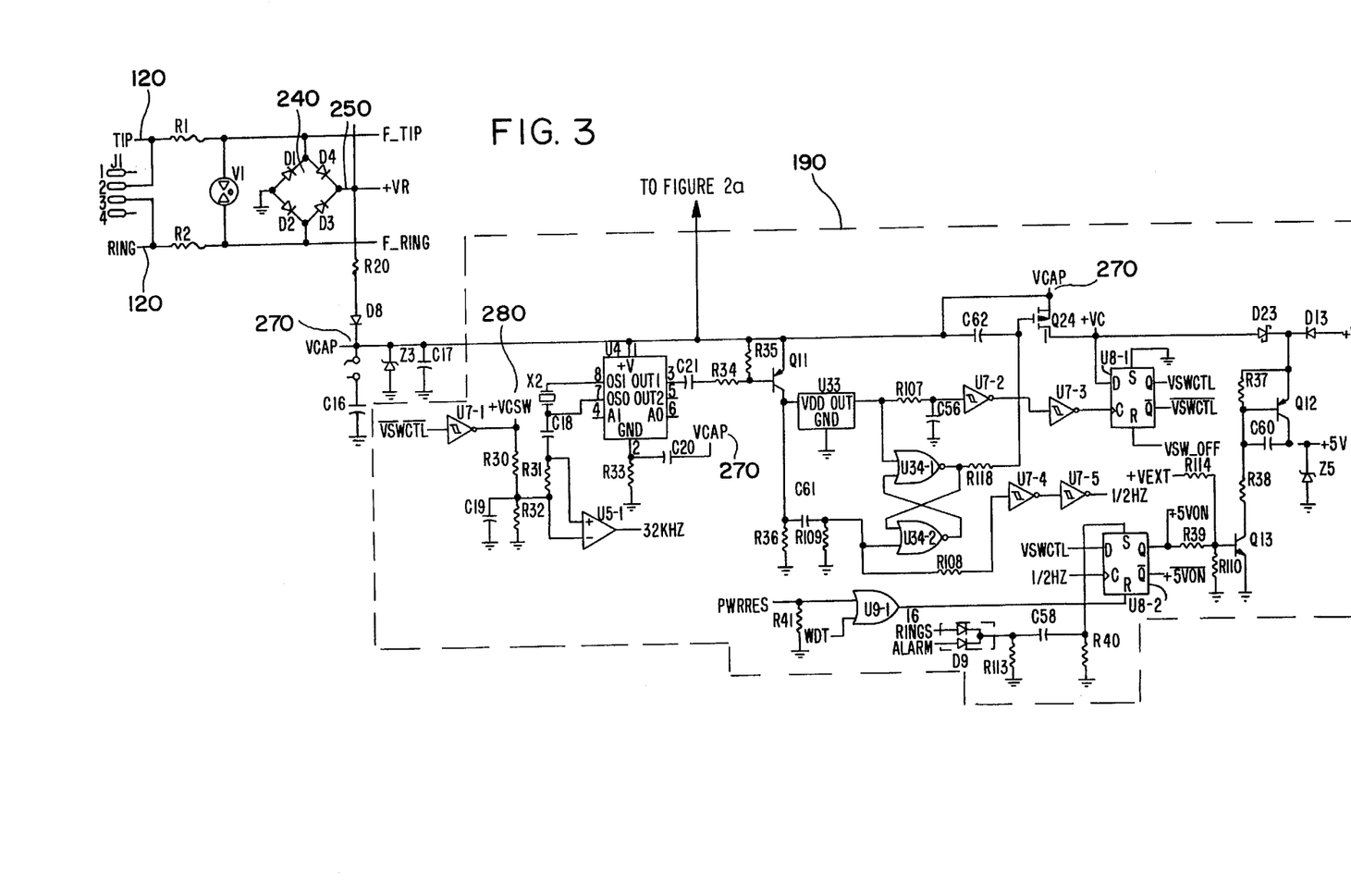
FIGS. 3, 4a, 4b and 5 shows the telephone line interface and the power control circuit in conjunction with the timing control circuit, alert tone detect circuit and the microprocessor.

Referring now to FIG. 3, Vcsw 280 is implemented as a simple logic gate switch of the Vcap 270 supply. Vcsw 280 is switched on by the timing control circuit 190 at a 0.5 Hz rate. Vcsw 280 provides power to the alert tone detect circuit 200. The +5V supply to the microprocessor U22 is switched on by transistors Q12 and Q13 and the associated resistor networks. With respect to the voltages seen in FIG. 3, voltage +Vc is sourced from Vcap via Q24. It is normally at the voltage of Vcap, which is from 3 to 5 volts. Q24 is used to isolate Vcap from Vc during times when Vcap is unusually low, that being under 3 volts. Regarding the +5 voltage discussed above, this voltage is five volts when the microprocessor U22 is active. When the microprocessor is inactive, it is at zero volts. It is supplied through Q12 from the larger of +Vc or +V, via diodes D23 and D13.

Timing control circuit 190 manages the MIU 100 time dependent operations. The timing control circuit 190 causes various parts of the MIU 100 to briefly come on-line to perform a routine check of the MIU 100 system. After the routine check is completed and if data transmission is not required, the particular element is taken off-line. The timing control circuit 190 remains active even if there is no power available from the telephone line 120 for a 24 hour period. If the contents of the timer are lost, the MIU 100 immediately attempts to call the central computer.

The timing control circuit 190 includes a 32 KHz oscillator U4 working in conjunction with a 32768 Hz crystal X2. Oscillator U4 is a commercially available low power oscillator. The current drain of the oscillator U4 is controlled to a minimum by biasing oscillator U4 through a large value resistor R33. Oscillator U4 is the only component in the MIU 100 which runs continuously.

The oscillator U4 generates a 0.5 Hz signal from an internal divider and a 32 KHz signal from the coupling of capacitor C18, resistor R31, and operational amplifier U5. Binary counter U26 counts the number of 0.5 Hz signals. After a predetermined number of 0.5 Hz signals, binary counter U26 causes the microprocessor U22 to come on-line.

Figure 4A:
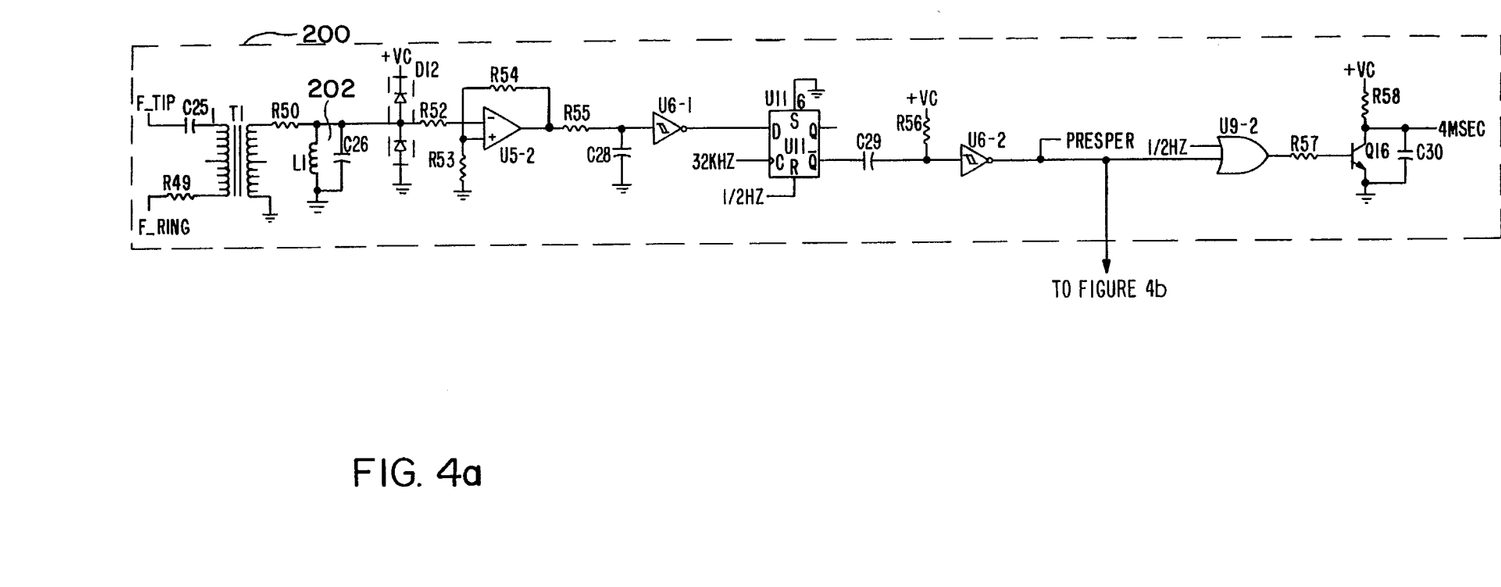
Figure 4B:
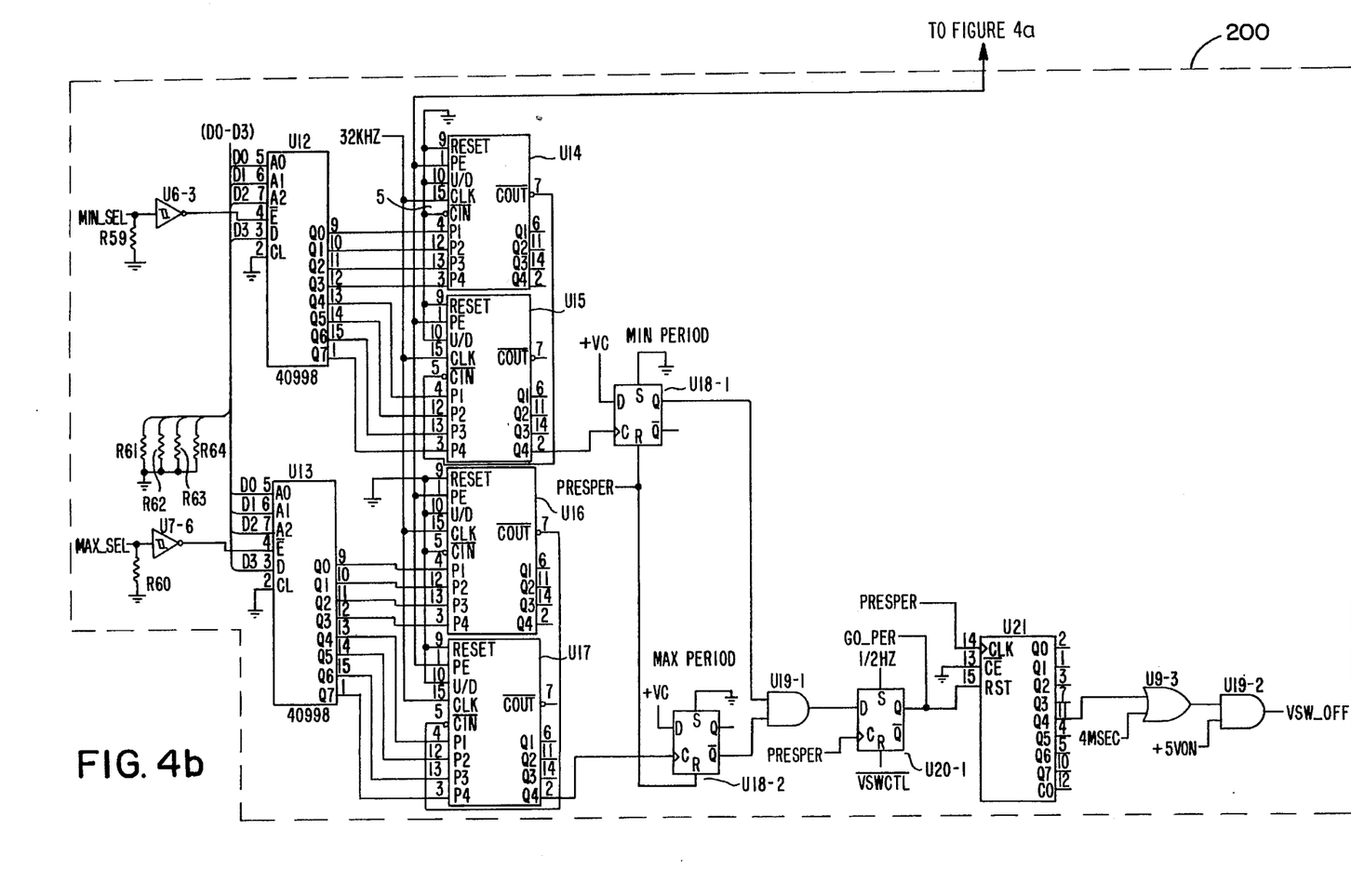
Figure 5:
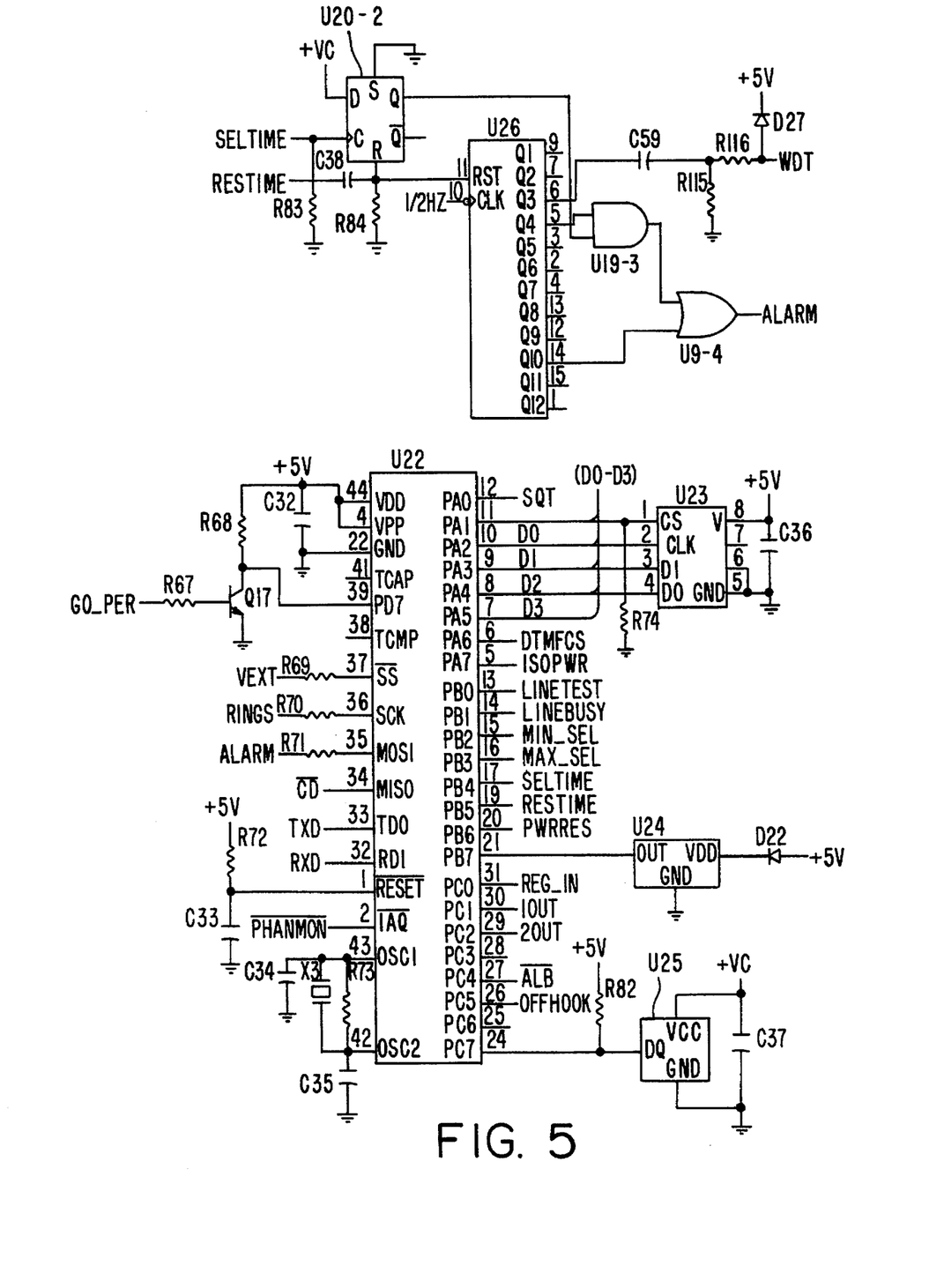

During the idle state as shown in FIGS. 4a, 4b, and 5 the 0.5 Hz signal powers-up the alert tone detect circuit 200. The alert tone detect circuit 200 allows the MIU 100 to make unscheduled meter data reports. The unscheduled data report may be established by either the customer or the utility company. The alert tone detect circuit 200 monitors the telephone line 120 every 2 seconds for a 520 Hz alert tone. The 520 Hz tone signal is acoustically coupled onto the line at the utility office. If the 520 Hz tone is detected, the microprocessor U22 checks for a command message modulated on the tone.

As shown in FIGS. 4a, 4b and 5, the alert tone detect circuit 200 is transformer coupled to the telephone line 120. Transformer T1 is connected across the telephone line 120 via capacitor C25 and resistor R49. The alert tone circuit 200 couples any audio signals to operational amplifier U5 via an inductive-capacitance (LC) Filter 202. LC filter 202 includes inductor L1 and capacitor C26 which are centered on 520 Hz. The audio tone is timed by counters U12, U13, U14, U15, U16, U17, U18, U19, U20 and U21 to check for a valid alert tone period. If a valid tone is detected, the microprocessor U22 (as shown in FIG. 5) checks for a message modulated on the tone.

Figure 6A:
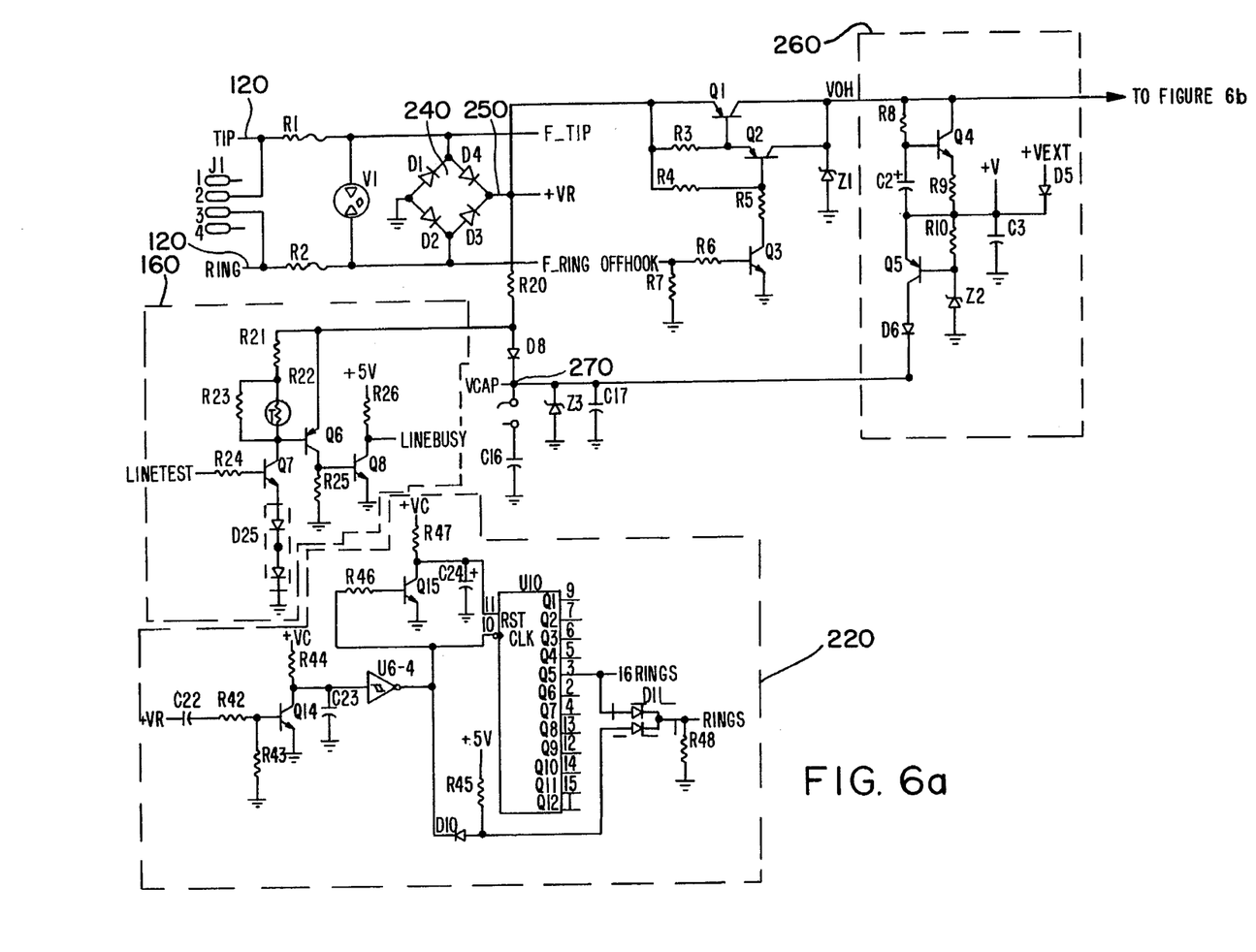
FIGS. 6a and 6b shows the telephone line interface and power control circuits in conjunction with the phantom monitor, line status, ring detect, and modem circuits.
Figure 6B:
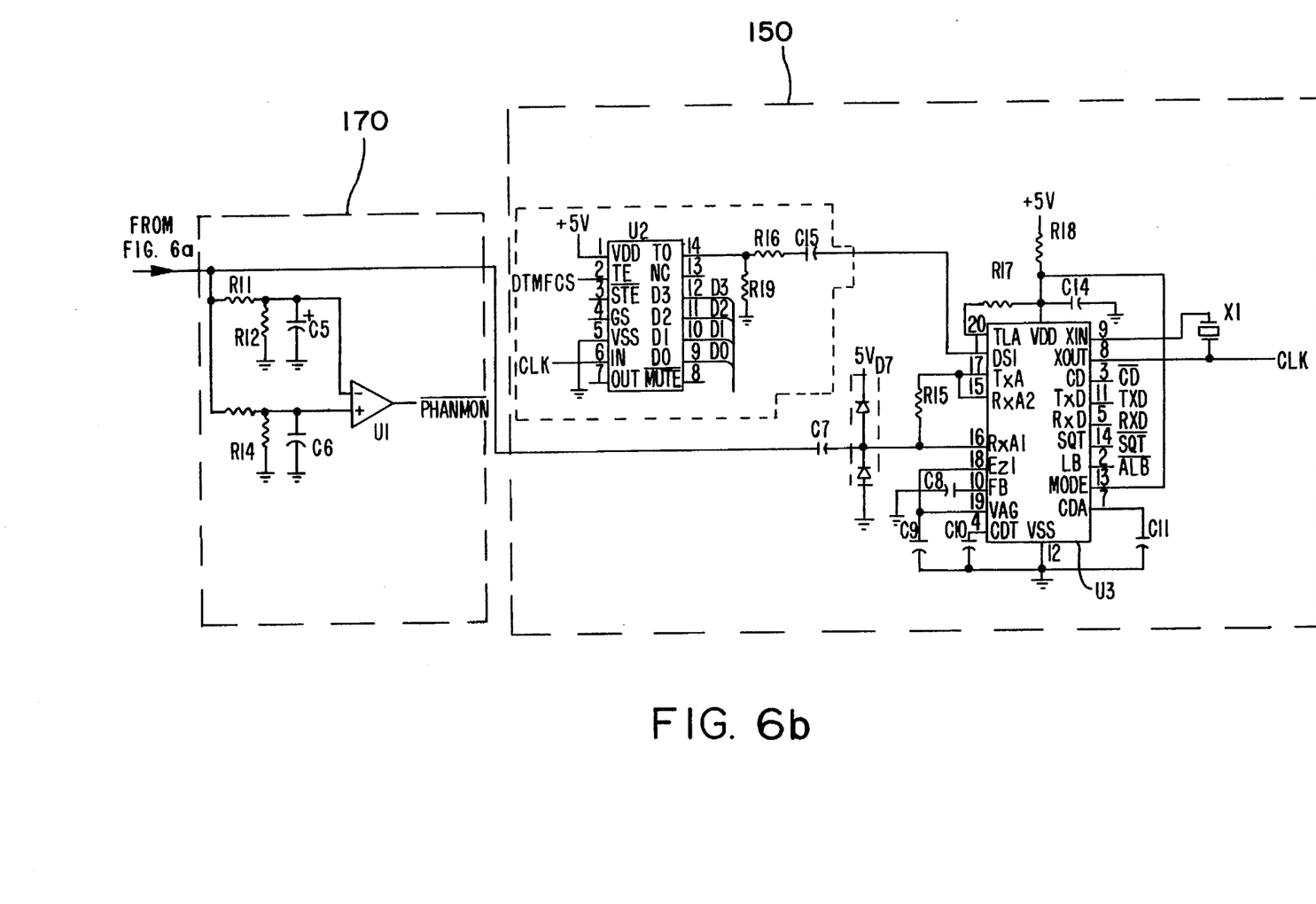

An unscheduled read may also be achieved by activating the ring detect circuit 220. FIG. 6a and 6b show a schematic of the ring detect circuit 220. The ring detect circuitry 220 allows the MIU 100 to monitor the telephone line 120 for a pre-determined number of ring signals. If a specified number of ring signals are detected, the MIU 100 will initiate a standard meter read and transmission cycle.

Transistor Q14 and Schmitt-trigger U6 buffer any detected incoming ring signals. The output of transistor Q14 and Schmitt-trigger U6 is used to remove the reset of binary counter U10 and to increment the binary counter U10 upon each ring signal. The transistor Q15, resistor R47, and capacitor C24 form a delay circuit which prevents the resetting of the binary counter U10 until ringing has ceased. The binary counter U10 waits approximately 7 seconds after the last ring signal before activating the reset command. When the binary counter U10 has incremented 16 times, indicating 16 ring signals, the ring detect circuit 220 alerts the microprocessor U22. A demand read/call-in sequence is then commenced.

The ring detect circuit 220 also triggers the single ring status to the microprocessor U22. The single ring function prevents the MIU 100 from inadvertently answering an incoming call when the MIU 100 is preparing to initiate a data transmission sequence.

The microprocessor U22 (see FIG. 5) is a Motorola 68HC05 family device. The microprocessor U22 contains on-board ROM, RAM, timers and serial ports. Microprocessor U22 controls all MIU 100 functionalities. The microprocessor U22 also stores the time for the next scheduled meter reporting time. A 1.8432 MHz crystal X3 generates the microprocessor clock. The command set supported by the MIU 100 microprocessor U22 enables the central computer to give the MIU 100 certain instructions.

When the MIU 100 calls the central computer, the central computer may request the reason for the call. It may also request the MIU 100 ID number. The central computer may instruct the MIU to hang-up and call back after a delay. The central computer can also request that any of the data stored in the microprocessor U22 memory be sent or changed. Finally, the central computer may terminate a call with a Good-bye command. Other commands may be added as necessary.

The MIU 100 dials-up the central computer using a built-in modem 150, shown in FIG. 6b. The microprocessor U22 issues the dial-up command either because the scheduled meter reporting time has occurred or a demand read has been requested.

Modem functions are implemented using a commercially available single-chip modem U3. This integrated circuit contains a frequency shift keyed (FSK) modulator, demodulator, and filter. It operates as a 300 baud, full duplex originate mode modem. A dual tone multi-frequency (DTMF) dialer chip U2 generates DTMF dialing tones. Standard Bell 103 tones are used. The DTMF signal tones pass into and out of single-chip modem U3 in order to get the dialing signal on the telephone line 120. Both dialer chip U2 and single-chip modem U3 use a 3.579 MHz crystal X1 for timing and tone generation. If DTMF dialing service is not available, the MIU 100 can also pulse dial the telephone line 120 by turning transistor Q1 on and off under the control of the microprocessor U22.

When the MIU 100 wants to use the telephone line 120, the microprocessor U22 issues the line test command to determine if the line is available for use. The status of the telephone line 120 is determined by the line status circuit 160. If the telephone line 120 is busy, the MIU 100 will not seize the telephone line 120.

The line status circuit 160 monitors the voltage on the telephone line 120 through transistors Q6, Q7 and Q8. If the voltage on the telephone line 120 is high, the MIU 100 assumes the telephone line 120 is free. If the voltage is low, the MIU 100 assumes the telephone line 120 is busy. Resistor R20 supplies current to the line status circuit 160.

If the MIU 100 seizes the telephone line 120, the phantom monitor 170 continuously surveys the telephone line 120 for a drop in voltage. The phantom monitor 170 includes resistors R11–R14, capacitor C5, capacitor C6 and comparator U1. If another telephone is taken off-hook at the customer's location, the phantom monitor 170 will sense a voltage drop. This voltage drop indicates to the MIU 100 that the customer is attempting to use the telephone line 120. The MIU 100 will immediately abort its transmission and disconnect from the telephone line 120.

After the MIU 100 calls the central computer and a connection has been established, the MIU 100 waits for the central computer to issue a command. If the central computer does not issue a command after 12 seconds, the MIU 100 hangs-up and repeats the call at a later time. The MIU 100 repeats the call to the central computer according to a retry algorithm programmed into the microprocessor U22.

The commands of the retry algorithm depend upon the reason for the original call and the number of retry attempts already performed. Each reason for the call is assigned to one of several categories, and a separate retry algorithm exists for each category. The number of retries determines the state within each algorithm. For purposes of the retry algorithm, an attempt to call the central computer when the customer's line is busy is not considered an unsuccessful call. In this case, the call is simply scheduled for a fixed period of time later, and the retry state is not changed.

Figure 7:
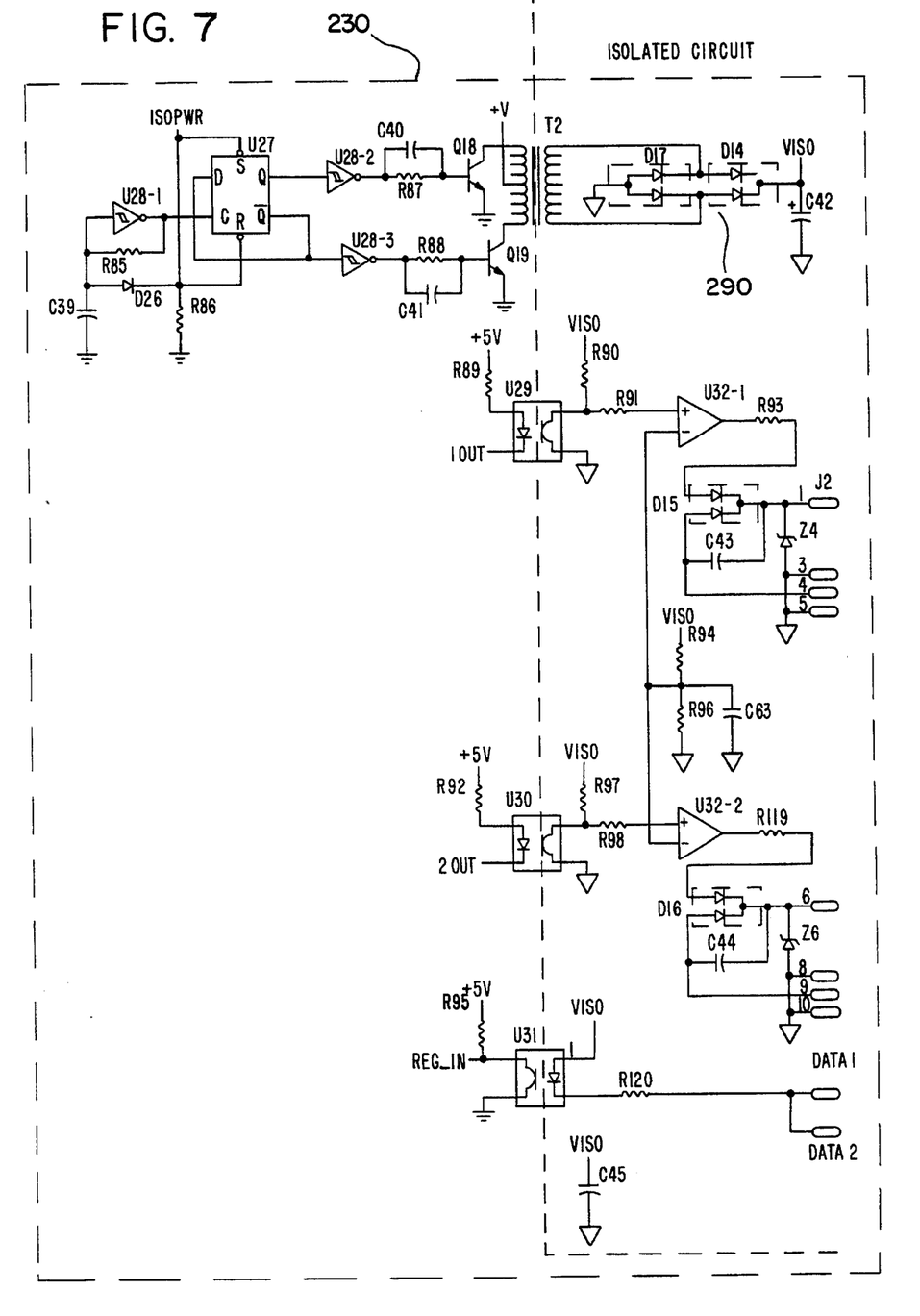
FIG. 7 is a schematic of the meter interface circuit.

The MIU 100 has the capability of interfacing with two encoder-type utility meters. As shown in FIG. 7, the meter interface 230 is established through an isolated circuit coupled by optoisolators U29, U30, and U32. The optoisolators U29, U30 and U32 send signals from the MIU 100 to the meters. Optoisolator U31 transmits the data from the meters back to the MIU 100.

Current is supplied to the isolated circuits by a transformer T2. As shown in FIG. 7 the rectifier network 290, which includes diodes D14 and D17, corrects the polarity of the output from transformer T2. Input voltage to transformer T2 is clocked by D-type Flip-Flop U27 and Schmitt-trigger U28. Transformer T2 receives voltage only when the microprocessor U22 requires data from the meters. As shown in this figure, the voltage designated ISOPOWER represents a signal that turns an isolated power source on and off. This signal is generated by the microprocessor U22 to control flip flop U27.

The MIU 100 is capable of detecting and reporting to the central computer, incidents of tampering at the installation site. If a tamper occurs, the MIU 100 reports this fact when the MIU 100 calls the central computer to report meter readings.

Figure 8:
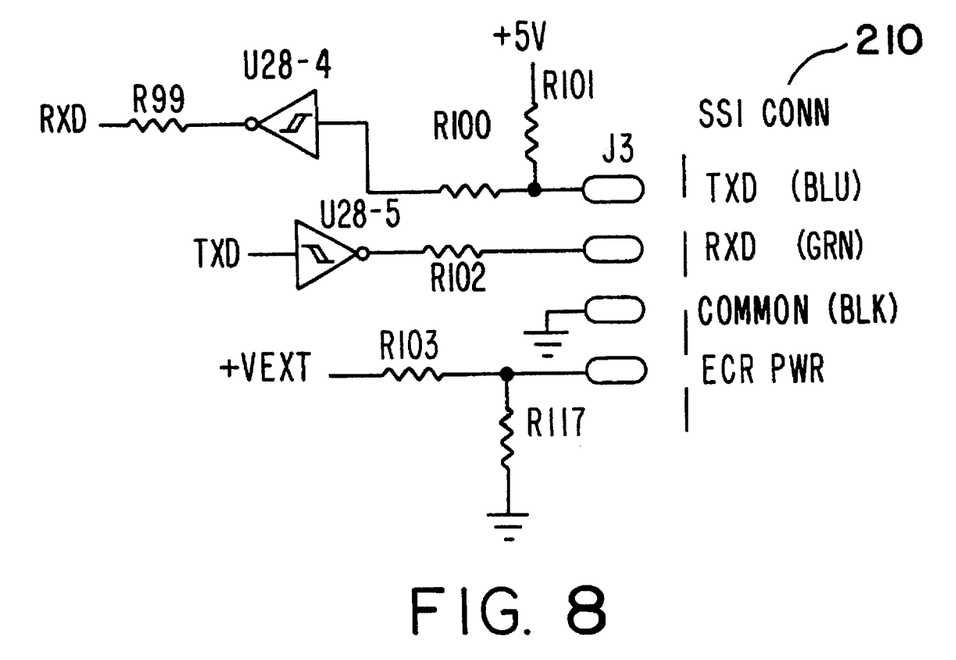
FIG. 8 shows the programming unit interface.

The programming unit interface 210 is a non-isolated port. The programming unit interface 210 is shown in FIG. 8 as a small signal integration (SSI) connection. The programming unit interface 210 enables a portable programming unit to interrogate and configure the MIU 100 during installation. Schmitt-trigger U28 is used to buffer the signals to and from the programming unit. As shown in this figure, the voltage designated ECR PWR represents an external voltage from a programming device, which is used when the MIU is being programmed, at which time it is not connected to a telephone line.

The MIU 100 is programmed with a unique identification number. The MIU 100 identification number is set at the factory and it not reconfigurable. Each port of the MIU 100 has a separate port identification number. The MIU 100 port identification numbers may be programmed either remotely or by the programming unit.

The MIU 100 is also programmed with three telephone numbers: the primary data reporting number, an alternate reporting number, and an emergency/tamper number. These numbers are stored in the MIU 100 ports. Each phone number has a minimum of 40 digits, including delays. The MIU 100 retains these telephone numbers in ROM. When the MIU 100 needs to communicate with the central computer, the MIU 100 determines the appropriate telephone number to call.

The instant invention provides a novel dial in-bound MIU which derives its power from a telephone line. The construction of the invention eliminates the need for an external power supply. While the invention is particularly shown and described with reference to the aforementioned embodiment, it will be understood by those skilled in the art that various changes in form and detail may be made therein without departing from the spirit and scope of the invention. Thus, any modifications to the configuration and composition of the elements comprising the MIU circuitry is within the scope of the present invention.

What is claimed:

1. An interface unit capable of deriving its power from a telephone line and capable of data transmission to a central location over the telephone line, said interface unit comprising:

means for receiving data;

means for transmitting data;

means for determining the time at which said means for receiving data and means for transmitting data are to be active, means for coupling a telephone line to said data transmitting means, the telephone line alternatingly maintaining an on-hook or an off-hook condition;

means for obtaining a current from the telephone line, wherein a leakage current is obtained during an on-hook condition, and a current of greater amperage than said leakage current is obtained during an off-hook condition; and long term storage means for long term storing of a charge derived from the leakage current, wherein said long term storage means is capable of energizing said interface unit throughout the duration of said on-hook condition, and wherein said determining means is continuously energized by said long term storage means whenever the telephone line is in the on-hook condition.

2. A dial-in-bound meter interface unit that derives its power from a telephone line and transmits meter data over the telephone line, said meter interface unit comprising:

microprocessor means for processing information and controlling functionalities of said meter interface unit, said microprocessor means including means for obtaining data from a utility meter and means for communicating with a central computer;

means for coupling the telephone line to said communicating means, where the telephone line alternatingly maintains an on-hook condition or an off-hook condition;

means for determining if a time for activating said microprocessor means has elapsed;

means for receiving a leakage current from the telephone line during the on-hook condition, long term storage means, responsive to said receiving means, for long term storing of a charge derived from the leakage current during said on-hook condition, wherein said long term storage means continuously energizes said determining means when the telephone line is in the on-hook condition; and wherein said long term storage means has the capability to provide a voltage to energize said meter interface unit until the telephone line is in the off-hook condition, whereupon said meter interface unit is energized by voltage from the telephone line.

3. The dial in-bound meter interface unit of claim 2, further comprising ring detection means for detecting a predetermined number of ring signals on the telephone line, where the predetermined number of rings signals is indicative of a data transmission request from the central computer.

4. The dial in-bound meter interface unit of claim 2, wherein said long term storage means comprises a capacitor.

5. The dial in-bound meter interface unit of claim 4, wherein said capacitor is capable of storing enough charge to operate said determining means and to energize said meter interface unit for a 24 hour period.

6. The dial in-bound meter interface unit of claim 4, wherein said capacitor is a double layer capacitor.

7. The dial in-bound meter interface unit of claim 4, wherein said capacitor is a double layer high energy capacitor.

8. The dial in-bound meter interface unit of claim 4, wherein said long term storage means further comprises a resistor.

9. The dial in-bound meter interface unit of claim 8, wherein said capacitor has a capacitance of about 0.22 Farads and wherein said resistor has a resistance of about 10 Megohms.

10. The dial in-bound meter interface unit of claim 2, further comprising tone detection means for detecting a tone sent over the telephone line from the central computer indicative of a request to transmit data when the telephone line is in at least one of the on-hook condition and off-hook condition.

11. The dial in-bound meter interface unit of claim 2, further comprising monitoring means for monitoring the telephone line to determine if the telephone line is in use before said meter interface unit seizes the telephone line to communicate with the central computer.

12. The dial in-bound meter interface unit of claim 2, further comprising means for disconnecting said meter interface unit when a customer initiates use of the telephone line.

13. The dial in-bound meter interface unit of claim 2, further comprising means for programming said meter interface unit.

14. The dial in-bound meter interface unit of claim 2, further comprising a modem for generating a dialing tone on the telephone line.

15. The dial in-bound meter interface unit of claim 2, wherein said microprocessor means further includes means for initiating a retry transmission in the event that the central computer does not respond to an initial transmission from said communicating means.

16. The dial in-bound meter interface unit of claim 2, further comprising means for detecting tampering with said meter interface unit.

* * * * *